United States Patent
Ponugoti et al.

(10) Patent No.: US 12,549,956 B2
(45) Date of Patent: Feb. 10, 2026

(54) OPTIMAL NEW RADIO (NR) RESOURCE ALLOCATION USING BANDWIDTH PART (BWP) ACROSS ASYMMETRIC DSS NETWORKS

(71) Applicant: T-Mobile Innovations LLC, Overland Park, KS (US)

(72) Inventors: Rishitha Ponugoti, Kirkland, WA (US); Roopesh Kumar Polaganga, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 760 days.

(21) Appl. No.: 17/534,067

(22) Filed: Nov. 23, 2021

(65) Prior Publication Data

US 2023/0164576 A1    May 25, 2023

Related U.S. Application Data

(63) Continuation-in-part of application No. 17/533,396, filed on Nov. 23, 2021.

(51) Int. Cl.
*H04W 16/14*    (2009.01)
*H04L 43/0894*  (2022.01)
*H04W 24/08*    (2009.01)
*H04W 28/20*    (2009.01)

(52) U.S. Cl.
CPC ......... *H04W 16/14* (2013.01); *H04L 43/0894* (2013.01); *H04W 24/08* (2013.01); *H04W 28/20* (2013.01)

(58) Field of Classification Search
CPC ..... H04W 16/14; H04W 24/08; H04W 28/20; H04W 88/10; H04W 72/0453; H04L 43/0894; H04L 41/022; H04L 43/16
See application file for complete search history.

(56) References Cited

U.S. PATENT DOCUMENTS

| | | | |
|---|---|---|---|
| 11,696,146 B1 * | 7/2023 | Viorel ..................... | H04L 5/001 370/329 |
| 11,700,535 B1 | 7/2023 | Polaganga et al. | |
| 2021/0266753 A1 * | 8/2021 | Kumar .............. | H04W 28/0252 |

(Continued)

OTHER PUBLICATIONS

Barb G, Alexa F, Otesteanu M. Dynamic Spectrum Sharing for Future LTE-NR Networks. Sensors (Basel). Jun. 19, 2021;21(12):4215. doi: 10.3390/s21124215. PMID: 34205459; PMCID: PMC8235763. (Year: 2021).*

(Continued)

*Primary Examiner* — Justin T Van Roie
(74) *Attorney, Agent, or Firm* — Shook, Hardy and Bacon L.L.P.

(57) ABSTRACT

System and method are provided for a dynamic radio access technology (RAT) bandwidth adaptation across asymmetric dynamic spectrum sharing (DSS) networks. DSS is implemented for Long Term Evolution (LTE) in 4G and New Radio (NR) in 5G. When the traffic usage for one radio access technology (LTE) exceeds its bandwidth capacity in a bandwidth part that has DSS, the radio network node identifies bandwidth parts that can receive NR users. NR users are moved from the bandwidth part that has DSS to bandwidth parts that are NR only and have the capacity to take NR users.

10 Claims, 5 Drawing Sheets

(56) References Cited

U.S. PATENT DOCUMENTS

2023/0076738 A1* 3/2023 Dhanapal .............. H04W 36/36

OTHER PUBLICATIONS

Non-Final Office Action received for U.S. Appl. No. 17/533,396, mailed on Jun. 6, 2024, 10 pages.
Final Office Action received for U.S. Appl. No. 17/533,396, mailed on Feb. 12, 2025, 14 pages.
Final Office Action received for U.S. Appl. No. 17/533,396, mailed on Jun. 11, 2025, 13 pages.
Non-Final Office Action received for U.S. Appl. No. 17/533,396, mailed on Sep. 30, 2025, 12 pages.

* cited by examiner

OPTIMAL NEW RADIO (NR) RESOURCE ALLOCATION USING BANDWIDTH PART (BWP) ACROSS ASYMMETRIC DSS NETWORKS

CROSS-REFERENCE TO RELATED APPLICATIONS

This application is a Continuation-in-part of U.S. application Ser. No. 17/533,396, titled DYNAMIC RADIO ACCESS TECHNOLOGY BANDWIDTH ADAPTATION ACROSS ASYMMETRIC DSS NETWORKS, filed on Nov. 23, 2021, which is incorporated herein in its entirety.

BACKGROUND

To overcome interference challenges observed with symmetric dynamic spectrum sharing (DSS) solution, operators are exploring asymmetric DSS solutions in which both Long Term Evolution (LTE) and New Radio (NR) can have different carrier bandwidths. Current implementation is to define shared bandwidth portion manually and does not have the flexibility to dynamically expand and reduce this shared bandwidth portion within the larger bandwidth depending on varying traffic profiles. Likewise, NR can be defined as a Carrier Bandwidth Part (BWP), which is a contiguous set of physical resource blocks and a single user equipment (UE) can be configured up to a maximum of four (4) BWPs simultaneously. Current implementation does not have any mechanism to off-load or redirect NR traffic from a LTE-NR shared asymmetric DSS cell during high LTE load conditions.

Consider a band-X with contiguous 30 megahertz (MHz) bandwidth with NR cell defined for the entire bandwidth while 10 MHz is being used as shared DSS cell for both LTE and NR users. If LTE traffic usage gradually increases and congests the entire 10 MHz bandwidth while the 30 MHz bandwidth is underutilized, there is no mechanism to dynamically expand the LTE bandwidth inside the 30 MHz band-X. Similarly, if LTE shared 10 MHz bandwidth is significantly underutilized while NR traffic is high, it would be ideal to reduce the LTE bandwidth to minimize interference and improve NR throughputs.

Consider a band-X with 30 megahertz (MHz) with a NR cell defined for the entire bandwidth while 10 MHz (portion of the original 30 MHz) is used as shared DSS cell for both LTE and NR users. Additionally, four (4) BWPs are defined with BWP1 (10 MHz) is the DSS shared cell in which resources are shared across both LTE and NR users. BWP2 (20 MHz) is defined for the remaining non-shared (NR-only) spectrum. BWP3 (5 MHz) is defined as an overlapping portion within BWP2 while BWP4 represents the entire 30 MHz bandwidth of the carrier band. If LTE traffic usage gradually increases and congests the entire BWP1 (10 MHz) bandwidth while the 30 MHz NR bandwidth is underutilized, there is no mechanism to dynamically steer eligible NR users outside of the shared DSS cell to accommodate LTE users and optimally utilize spectrum resources.

SUMMARY

A method and system are provided to dynamically expand and reduce certain DSS shared radio access technology (RAT) bandwidth based on traffic usages. LTE and NR can share contiguous spectrum in an intra band scenario. When the bandwidth of LTE or NR exceeds a threshold, the bandwidth can be incrementally increased by a pre-defined amount, especially when the corresponding bandwidth of the adjacent technology (ie. the adjacent NR or LTE in DSS) is being underutilized. Also, when the bandwidth of LTE or NR is underutilized, the bandwidth can be incrementally reduced by a pre-defined amount, especially when the corresponding bandwidth of the adjacent technology in DSS is exceeding its bandwidth threshold.

A method and system are provided to dynamically off-load NR users from asymmetric DSS shared cells. LTE and NR can share contiguous spectrum in intra band and inter-band scenarios. When the bandwidth of LTE exceeds a threshold, the system looks for underutilized BWPs in the NR-only bandwidths. NR users are off-loaded or redirected from the LTE-NR shared DSS to an underutilized NR-only BWP.

BRIEF DESCRIPTION OF THE DRAWINGS

Illustrative embodiments of the present invention are described in detail below with reference to the attached drawing figures, and wherein.

DETAILED DESCRIPTION

Figure 1:
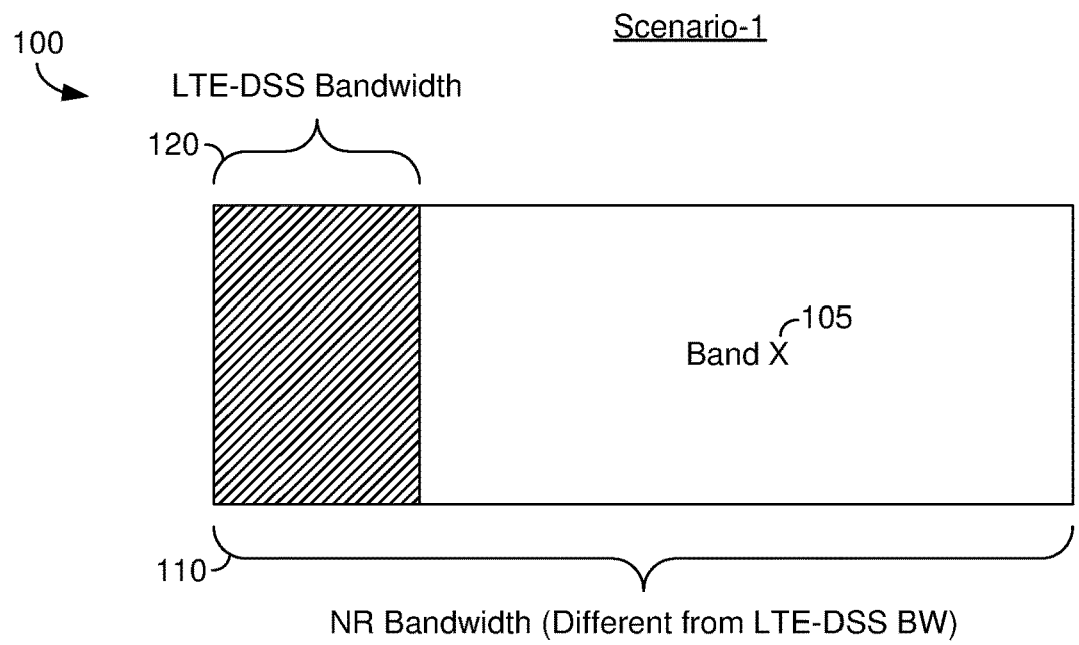
FIG. 1 is an illustration of dynamic spectrum sharing in band-X where New Radio (NR) bandwidth shares spectrum with Long Term Evolution (LTE) bandwidth, according to an implementation of an embodiment of the present invention.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| 5GCN | 5G Core Network |
| BS | Base Station |
| BTS | Base Transceiver Station |
| CDMA | Code Division Multiple Access |
| CDMA2000 | Code Division Multiple Access 2000 |
| DSS | Dynamic Spectrum Sharing |
| eNodeB or eNB | Evolved Node B |
| gNB or gNodeB | Next Generation Node B |
| GPRS | General Packet Radio Service |
| GSM | Global System for Mobile communications |
| IP | Internet Protocol |
| LTE | Long Term Evolution |
| MD | Mobile Device |
| ME | Mobile Equipment |
| ng-eNB | Next Generation Evolved Node B |
| NR | New Radio |
| OS | Operating System |
| PC | Personal Computer |
| PCS | Personal Communications Service |
| RAT | Radio Access Technology |
| RF | Radio-Frequency |
| RFI | Radio-Frequency Interference |
| SIM | Subscriber Identity Module |
| TDMA | Time Division Multiple Access |
| UE | User Equipment |
| UMTS | Universal Mobile Telecommunications Service |
| WCDMA | Wideband Code Division Multiple Access |
| WiMAX | Worldwide Interoperability for Microwave Access |

Further, various technical terms are used throughout this description.

In a first aspect, a method and system of dynamically changing a radio access technology (RAT) bandwidth based on traffic usage is provided that includes operating dynamic spectrum sharing (DSS) in a mobile communications network that includes a first wireless standard technology and a second wireless standard technology. A radio network node is configured to operate and monitor traffic usage in a first RAT and a second RAT. The first RAT operates in the first wireless standard technology and the second RAT operates in the second wireless standard technology. The first RAT is configured to operate with a first bandwidth larger than the second RAT that is configured to operate with a second bandwidth. The first RAT and the second RAT are configured to operate with DSS for a particular band. The radio network node is configured to expand the second bandwidth of the second RAT by a pre-defined amount when a second RAT utilization is higher than a second operator-defined threshold and a first RAT utilization is lower than a first operator-defined threshold. The radio network node is configured to reduce the second bandwidth of the second RAT by the pre-defined amount when the second RAT utilization is lower than the second operator-defined threshold and the first RAT utilization is higher than the first operator-defined threshold.

In a second aspect, a method of dynamically changing a radio access technology (RAT) bandwidth based on traffic usage is provided that includes operating dynamic spectrum sharing (DSS) in a mobile communications network that includes 4G wireless technology and 5G wireless technology. A radio network node monitors traffic usage in Long Term Evolution (LTE) and New Radio (NR) and configures bandwidths for LTE and NR. LTE operates in 4G wireless technology and NR operates in 5G wireless technology. NR operates with a first bandwidth larger than LTE, which operates with a second bandwidth, where NR and LTE operate with DSS for a particular band. Or, NR operates with the first bandwidth smaller than LTE, which operates with the second bandwidth, where NR and LTE operate with DSS for the particular band. When NR has a larger assigned bandwidth than LTE, the second bandwidth of LTE is expanded by a pre-defined amount when a LTE utilization is higher than a LTE operator-defined threshold and a NR utilization is less than a NR operator-defined threshold. Also, when NR has a larger assigned bandwidth than LTE, the second bandwidth of LTE is reduced by the pre-defined amount when the LTE utilization is less than the LTE operator-defined threshold and the NR utilization is higher than the NR operator-defined threshold. When NR has a smaller assigned bandwidth than LTE, the first bandwidth of NR is expanded by a pre-defined amount when the NR utilization is higher than the NR operator-defined threshold and the LTE utilization is less than the LTE operator-defined threshold. Also, when NR has a smaller assigned bandwidth than LTE, the first bandwidth of NR is reduced by the pre-defined amount when the NR utilization is less than the NR operator-defined threshold and the LTE utilization is higher than the LTE operator-defined threshold.

In a third aspect, a method for resource allocation using bandwidth parts across asymmetric dynamic spectrum sharing (DSS) networks is provided that includes operating DSS in a mobile communications network that includes a first wireless standard technology and a second wireless standard technology. A radio network node monitors traffic usage in a first RAT and a second RAT. The first RAT operates in the first wireless standard technology and the second RAT operates in the second wireless standard technology. A bandwidth is established for a particular band. A DSS bandwidth is identified within the particular band. The DSS bandwidth is shared between first RAT users and second RAT users. Non-shared bandwidths are identified within the particular band. The non-shared bandwidths are for first RAT users only. A combination of the DSS bandwidth and the non-shared bandwidths equals the bandwidth of the particular band. Traffic usage is monitored in each of the DSS bandwidth and the non-shared bandwidths. When a second RAT utilization is higher than a second operator-defined threshold in the DSS bandwidth, members of the non-shared bandwidths that have traffic usage lower than their respective first operator-defined thresholds are identified. A portion of the first RAT users from the DSS bandwidth is redirected to the members to accommodate the second RAT utilization in the DSS bandwidth.

In a fourth aspect, a system for resource allocation using bandwidth parts across asymmetric dynamic spectrum sharing (DSS) networks includes a mobile communications network that is configured to operate dynamic spectrum sharing (DSS) that includes 5G wireless technology and 4G wireless technology. A radio network node monitors traffic usage in New Radio (NR) and Long Term Evolution (LTE). NR operates in 5G wireless technology and LTE operates in 4G wireless technology. The radio network node establishes a bandwidth for a particular band, identifies a DSS bandwidth within the particular band. The DSS bandwidth is shared between NR users and LTE users. The radio network node also identifies non-shared bandwidths within the particular band. The non-shared bandwidths are for NR users only. A combination of the DSS bandwidth and the non-shared bandwidths equals the bandwidth of the particular band. In continuing, the radio network node also monitors traffic usage in each of the DSS bandwidth and the non-shared bandwidths. When a LTE utilization is higher than a LTE operator-defined threshold in the DSS bandwidth, the radio network node 1) identifies members of the non-shared bandwidths that have traffic usage lower than their respective NR operator-defined thresholds and 2) redirects a portion of NR users from the DSS bandwidth to the members to accommodate LTE utilization in the DSS bandwidth.

In FIG. 1, a graph 100 illustrates LTE and NR functioning in a shared radio access technology bandwidth. Particularly, graph 100 is an illustration of the assignment of bandwidth for New Radio (NR) 110 in 5G wireless technology and Long Term Evolution (LTE) 120 in 4G wireless technology. The actual assignment of bandwidth occurs in either an eNodeB, gNB, or ng-eNB, which are the radio access technology devices used to connect cellular wireless devices back to a core network. As one can see in graph 100, LTE shares bandwidth with NR, and this shared bandwidth is referred to as dynamic spectrum sharing (DSS). For example, NR 110 could have a bandwidth of 30 MHz and LTE 120 could have a bandwidth of 10 MHz. The DSS would be that portion of 10 MHz shared between NR and LTE. This sharing of bandwidth enables an operator to have both 4G LTE users and 5G NR users operate in a same band-X 105.

In an implementation of an embodiment of the present invention, the bandwidth of NR 110 and LTE 120 can dynamically be adjusted to accommodate changes in traffic usage for 5G NR users and 4G LTE users. This can occur when there is a contiguous bandwidth spectrum in an intra band scenario. An operator configures bandwidth thresholds for NR 110 and LTE 120 in an eNodeB, gNB, or ng-eNB. For FIG. 1, when traffic usage for LTE 120 reaches the bandwidth threshold, the eNodeB, gNB, or ng-eNB checks the bandwidth for NR 110. And if the traffic usage for NR 110 is less than its allocated bandwidth threshold, the eNodeB, gNB, or ng-eNB increases the bandwidth of LTE 120 by a pre-defined amount. The increase in bandwidth can occur up to a set maximum imposed by the operator Likewise, if the traffic usage for LTE 120 is less than the bandwidth threshold set for 4G LTE users and the traffic usage for NR 110 is more than the bandwidth threshold set for 5G NR users, the eNodeB, gNB, or ng-eNB reduces the bandwidth of LTE 120 by a pre-defined amount. The decrease in bandwidth can continue to occur down to a minimum set by the operator.

Figure 2:
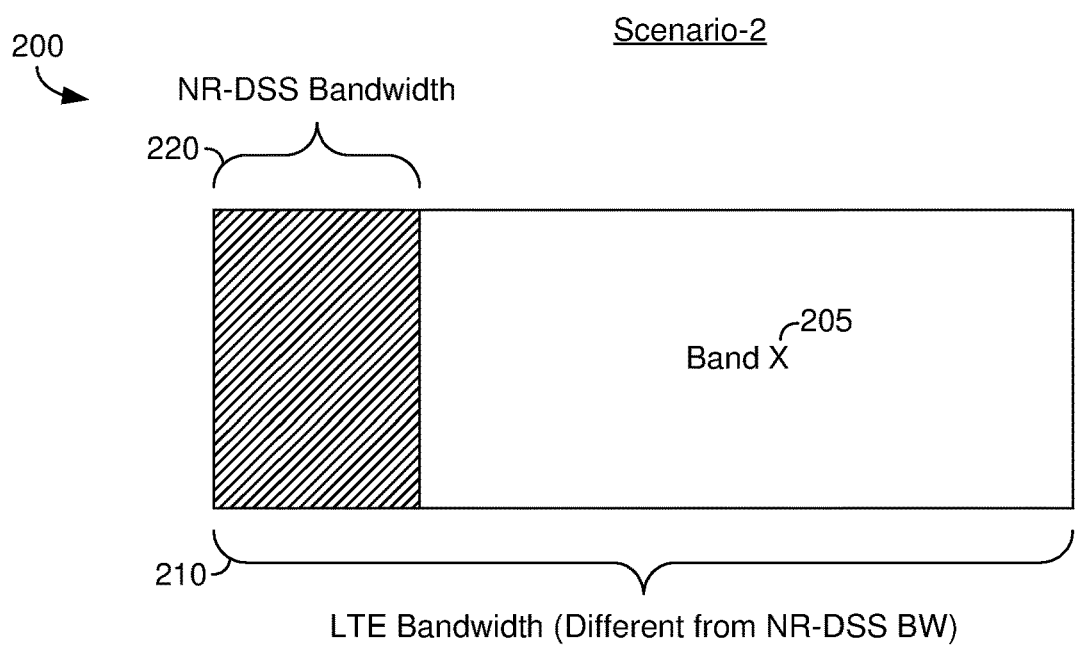
FIG. 2 is an illustration of dynamic spectrum sharing in band-X where Long Term Evolution (LTE) bandwidth shares spectrum with New Radio (NR) bandwidth, according to an implementation of an embodiment of the present invention.

Turning now to FIG. 2, a graph 200 illustrates a converse of graph 100. Graph 200 illustrates of NR and LTE functioning in a shared radio access technology bandwidth. Particularly, graph 200 is an illustration of the assignment of bandwidth for LTE 210 in 4G wireless technology and NR 220 in 5G wireless technology. As one can see in graph 200, NR shares bandwidth with LTE, in DSS. For example, LTE 210 could have a bandwidth of 30 MHz and NR 220 could have a bandwidth of 10 MHz. The DSS would be that portion of 10 MHz shared between NR and LTE. This sharing of bandwidth enables the operator to have both 4G LTE users and 5G NR users operate in a same band-X 205, similar to band-X 105.

As stated before for NR 110 and LTE 120, LTE 210 and NR 220 can dynamically be adjusted to accommodate changes in traffic usage for 4G LTE users and 5G NR users. The operator configures bandwidth thresholds for LTE 210 and NR 220, which might be slightly less than the full bandwidths shown in graph 200 in FIG. 2. For example, if LTE has a bandwidth of 30 MHz and NR 220 has a bandwidth of 10 MHz, the operator may allocate bandwidth thresholds that are less than the bandwidth maximums in order to reduce interference. Therefore, when traffic user for NR 220 reaches the bandwidth threshold, the eNodeB, gNB, or ng-eNB can check the bandwidth of LTE 210. If the traffic usage for LTE 210 is less than the allocated bandwidth threshold, the eNodeB, gNB, or ng-eNB can incrementally increase the bandwidth of NR 220 by a pre-defined amount. Likewise, if the traffic usage for NR 220 is less than the bandwidth threshold set for 5G NR users and the traffic usage for LTE 210 is more than the bandwidth threshold set for 4G LTE users, the eNodeB, gNB, or ng-eNB (or any other assigned radio access technology) can reduce the bandwidth of NR 220 by a pre-defined amount. The decrease can continue in a loop or repetitive arrangement until a minimum set by the operator is reached.

Figure 3:
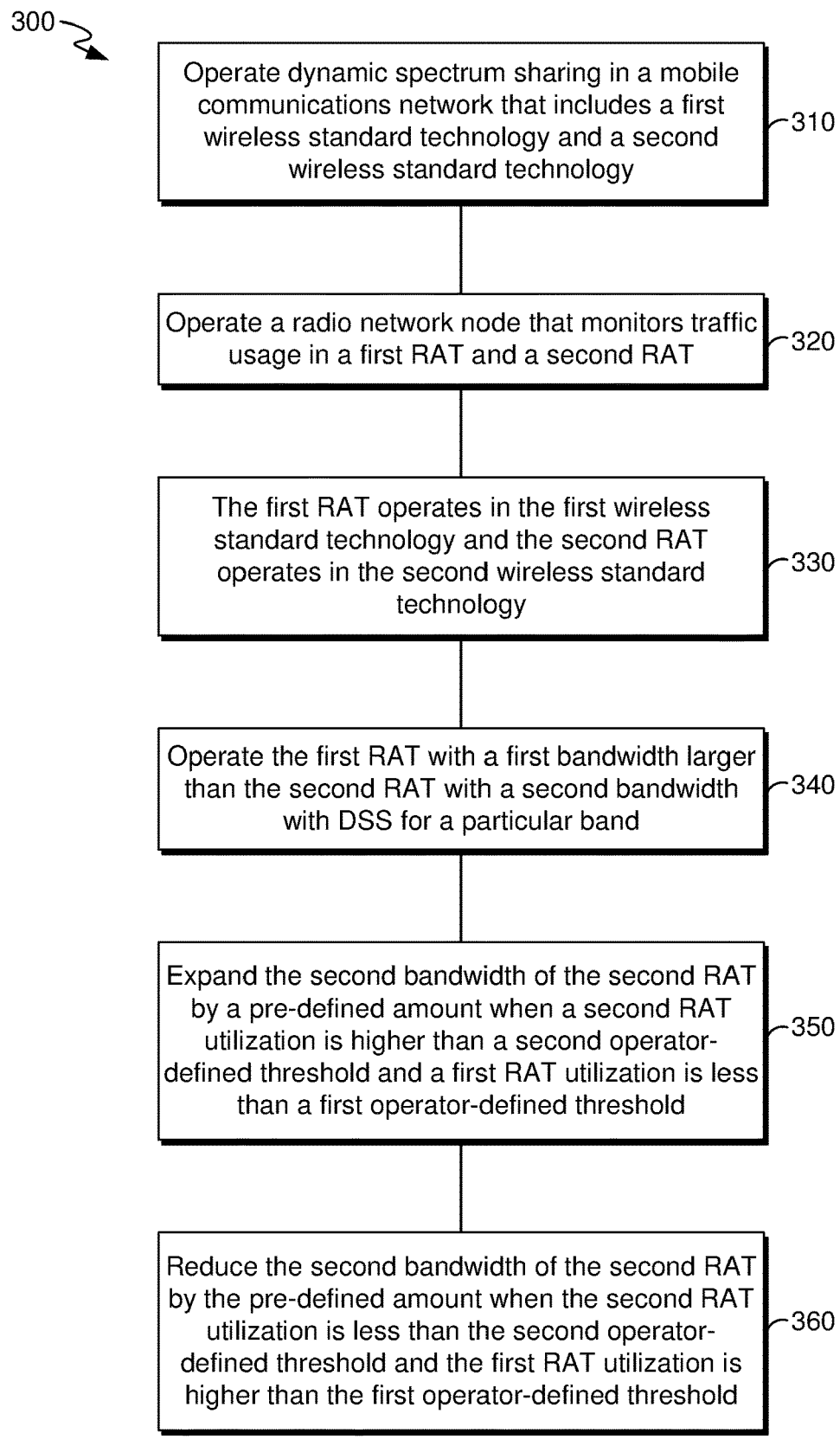
FIG. 3 illustrates a process for dynamically changing radio access technology (RAT) bandwidth based on traffic usage, according to an implementation of an embodiment of the present invention.

Turning now to FIG. 3, a method for dynamically changing radio access technology (RAT) bandwidth based on traffic usage is provided in a process 300. In a step 310, dynamic spectrum sharing (DSS) is provided in a mobile communications network that includes a first wireless standard technology and a second wireless standard technology. In a step 320, a radio network node monitors traffic usage in a first radio access technology (RAT) (e.g. NR 110, LTE 210) and a second radio access technology (RAT) (e.g. LTE 120, NR 220). The first RAT operates in the first wireless standard technology and the second RAT operates in the second wireless standard technology, in a step 330. In a step 340, the first RAT has a first bandwidth larger than the second RAT with a second bandwidth, with DSS for a particular band. In a step 350, the second bandwidth of the second RAT is expanded by a pre-defined amount when a second RAT utilization is higher than a second operator-defined threshold, and a first RAT utilization is less than a first operator-defined threshold. The second bandwidth of the second RAT is reduced by the pre-defined amount when the second RAT utilization is less than the second operator-defined threshold, and the first RAT utilization is higher than the first operator-defined threshold, in a step 360.

Figure 4:
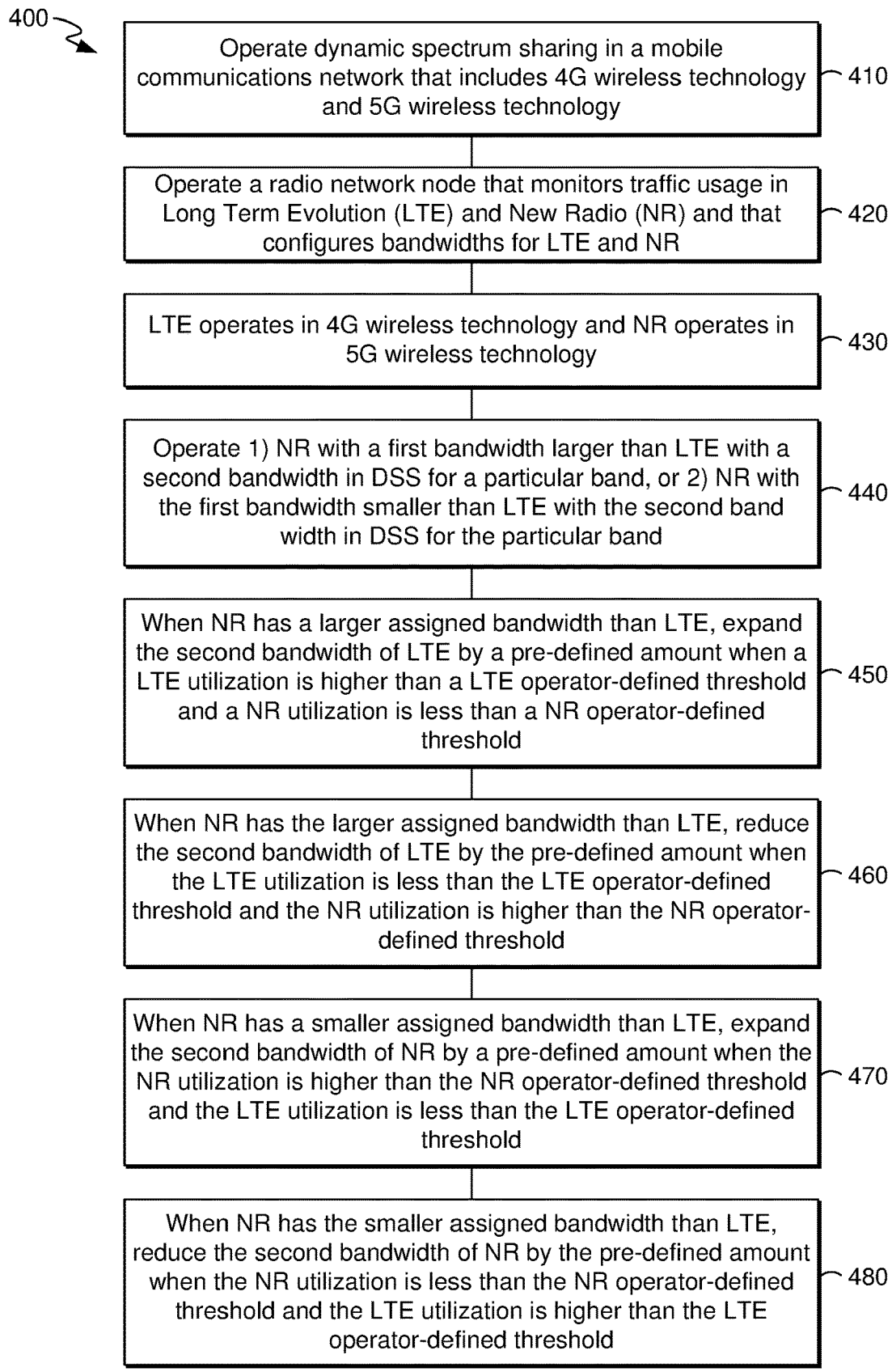
FIG. 4 illustrates another process for dynamically changing radio access technology (RAT) bandwidth based on traffic usage, according to an implementation of an embodiment of the present invention.

Turning now to FIG. 4, a method for dynamically changing radio access technology (RAT) bandwidth based on traffic usage is provided in a process 400. In a step 410, dynamic spectrum sharing (DSS) is provided in a mobile communications network that includes a 4G wireless technology and a 5G wireless technology. A radio network node monitors traffic usage in Long Term Evolution (LTE) (e.g. LTE 120, LTE 210) and New Radio (NR) (e.g. NR 110, NR 220) and configures bandwidths for LTE and NR, in a step 420. LTE operates in 4G wireless technology and NR operates in 5G wireless technology, in a step 430. In a step 440, NR has a first bandwidth that is larger than LTE with a second bandwidth for a particular band. Or, NR has the first bandwidth that is smaller than LTE with the second bandwidth for the particular band. When NR has a larger assigned bandwidth than LTE, the second bandwidth of LTE is expanded by a pre-defined amount when a LTE utilization is higher than a LTE operator-defined threshold and a NR utilization is less than a NR operator-defined threshold, in a step 450. In a step 460, When NR has the larger assigned bandwidth than LTE, the second bandwidth of LTE is reduced by the pre-defined threshold amount when the LTE utilization is less than the LTE operator-defined threshold and the NR utilization is higher than the NR operator-defined threshold. In a step 470, when NR has a smaller assigned bandwidth than LTE, the first bandwidth of NR is expanded by a pre-defined amount when the NR utilization is higher than the NR operator-defined threshold and the LTE utilization is less than the LTE operator-defined threshold. In a step 480, when NR has a smaller assigned bandwidth than LTE, the first bandwidth of NR is reduced by the pre-defined amount when the NR utilization is less than the NR operator-defined threshold and the LTE utilization is higher than the LTE operator-defined threshold.

Figure 5:
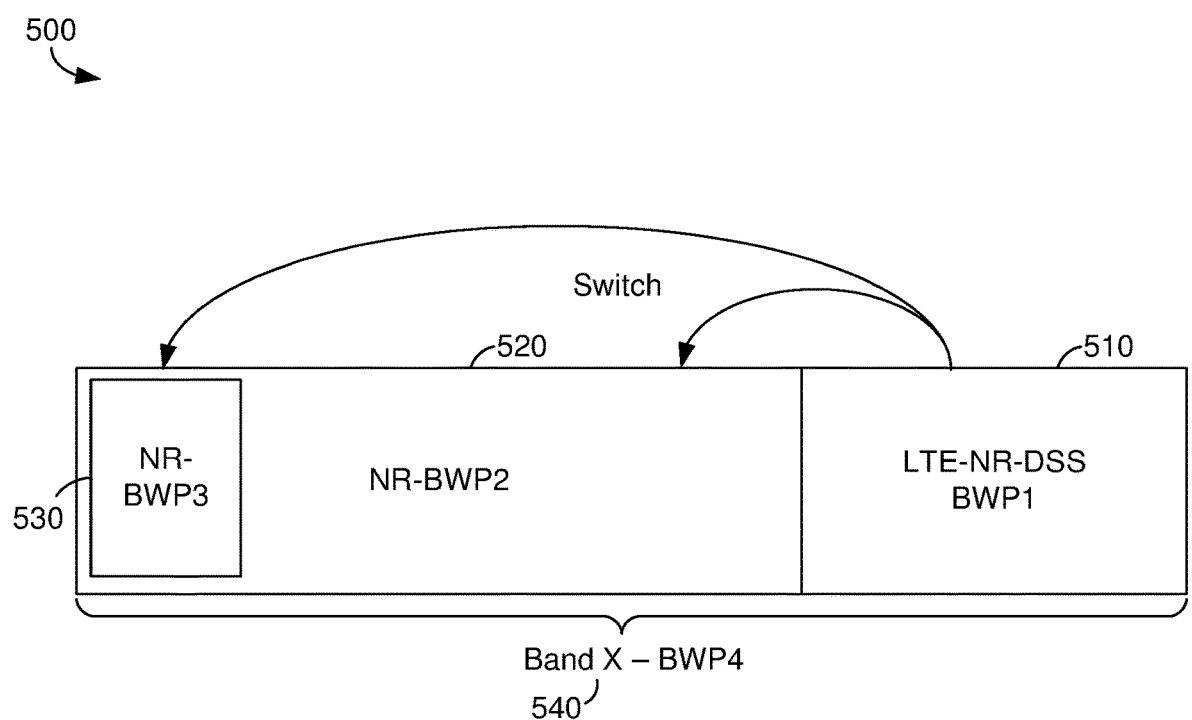
FIG. 5 is an illustration of dynamic spectrum sharing (DSS) and non-shared spectrum in band-X where Long Term Evolution (LTE) bandwidth shares spectrum with New Radio (NR) bandwidth in DSS, according to an implementation of an embodiment of the present invention.

In a FIG. 5, a graph 500 illustrates a contiguous set of bandwidth parts that make up the bandwidth of a particular band. The bandwidth parts include a DSS 510, NR 520, NR 530, and band-X 540. DSS 510 is a bandwidth spectrum known as BWP1 where LTE and NR share the bandwidth. NR 520 is a bandwidth spectrum known as BWP2 and is non-shared and allocated for NR users only. NR 530 is a bandwidth spectrum known as BWP3 and is also non-shared and allocated for NR users only. NR 530 is bandwidth that overlaps with NR 520. Band-X 540 is the full bandwidth spectrum of a carrier band and includes DSS 510, NR 520, and NR 530. As stated earlier, the actual assignment of bandwidth occurs in either an eNodeB, gNB, or ng-eNB.

In an implementation of an embodiment of the present invention, NR users can be redirected from DSS 510 to a non-shared NR-only bandwidth. An operator configures bandwidth thresholds for LTE and NR in the shared bandwidth part (DSS 510). The operator also configures bandwidth thresholds for NR-only bandwidths in NR 520 and NR 530. When traffic usage of LTE users reaches a threshold set by the operator, the radio network node checks the traffic utilizations in each of NR 520 and NR 530. If traffic usage is lower in any of the bandwidth parts of NR 520 and NR 530, the radio network node can move NR users from DSS 510 to either NR 520 (BWP2), NR 530 (BWP3), or both.

It is noted that graph 500 in FIG. 5 shows four (4) bandwidth parts as shown by DSS 510 (BWP1), NR 520 (BWP2), NR 530 (BWP3), and Band-X 540 (BWP4). However, an operator may implement the present invention in a different configuration with less than four (4) bandwidth parts. For example, an implementation of the embodiment of the present invention could have three bandwidth parts, such as DSS 510 (BWP1), NR 520 (BWP2), and Band-X 540 (BWP4). Another embodiment could have two bandwidth parts, such as DSS 510 (BWP1) and Band-X 540 (BWP4), which would resemble the configuration in FIG. 1. As such, the operator has flexibility in how the various bandwidth parts are implemented. The idea here is to provide a mechanism to off-load or redirect NR users from and a bandwidth that is shared to a bandwidth that has NR users only.

Figure 6:
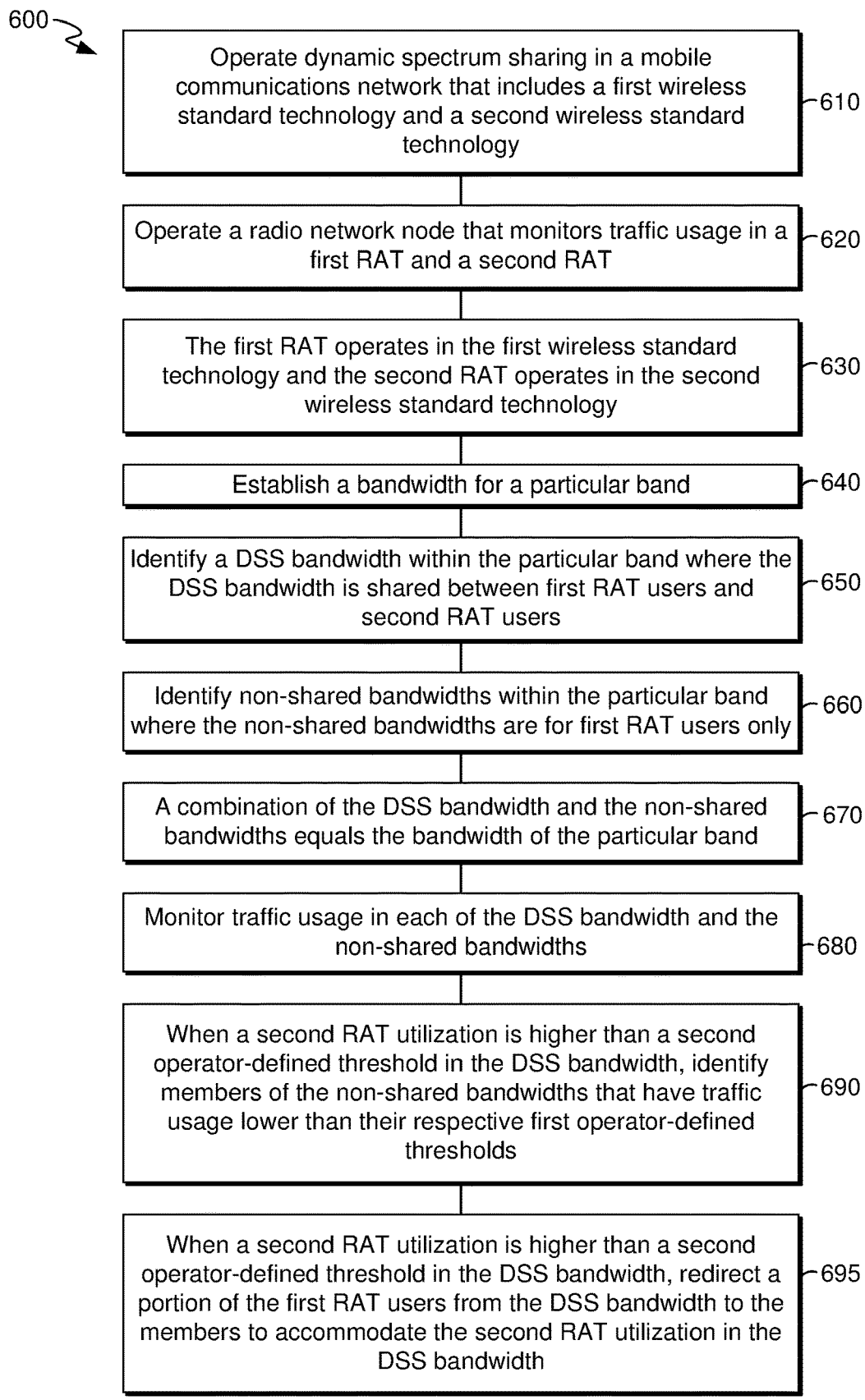
FIG. 6 illustrates a process for dynamically off-loading New Radio (NR) users from an asymmetric DSS cell based on traffic usage, according to an implementation of an embodiment of the present invention.

Turning now to FIG. 6, a method for resource allocation using bandwidth parts across asymmetric DSS networks is provided in a process 600. In a step 610, dynamic spectrum sharing (DSS) is provided in a mobile communications network that includes a first wireless standard technology (5G) and a second wireless standard technology (4G). In a step 620, a radio network node (e.g. eNodeB, gNB, or ng-eNB) monitors traffic usage in a first RAT (e.g. NR 110) and a second RAT (e.g. LTE 120). In a step 630, the first RAT (NR 110) operates in the first wireless standard technology (5G) and the second RAT (LTE 120) operates in the second wireless standard technology (4G). A bandwidth is established for a particular band (Band-X 540), in a step 640. In a step 650, a DSS bandwidth (DSS 510) is identified within the particular band (Band-X 540) where the DSS bandwidth (DSS 510) is shared between first RAT users (NR users) and second RAT users (LTE users). In a step 660, non-shared bandwidths (NR 520 and NR 530) are identified within the particular band (Band-X 540) where the non-shared bandwidths (NR 520 and NR 530) are for first RAT users (NR users) only. A combination of the DSS bandwidth (DSS 510) and the non-shared bandwidths (NR 520 and NR 530) equals the bandwidth of the particular band (Band-X 540), in a step 670. In a step 680, traffic usage is monitored in each of the DSS bandwidth (DSS 510) and the non-shared bandwidths (NR 520 and NR 530). When a second RAT utilization (LTE utilization) is higher than a second operator-defined threshold (e.g. LTE usage threshold) in the DSS bandwidth (DSS 510), members of the non-shared bandwidth (NR 520 and NR 530) are identified that have traffic usage lower than their respective first operator-defined thresholds (e.g. NR usage thresholds), in a step 690. When a second RAT utilization (LTE utilization) is higher than a second operator-defined threshold (e.g. LTE usage threshold) in the DSS bandwidth (DSS 510), a portion of the first RAT users (NR users) is redirected or off-loaded from the DSS bandwidth (DSS 510) to the members to accommodate the second RAT utilization (LTE utilization) in the DSS bandwidth (DSS 510), in a step 695. In other words, NR users are moved from DSS 510 to NR-only bandwidths such as NR 520 and NR 530, so long as those bandwidths have capacity.

The implementation of embodiments of the present invention improves user experience for LTE-only devices by allowing LTE-only devices to have access to the network. Additionally, user experience for NR-only devices is improved by minimizing interference from LTE devices when NR-only devices are moved away from a DSS cell. Overall, the implementation of the embodiments provides optimal network resource utilization for both LTE and NR users.

The invention claimed is:

1. A method for resource allocation using bandwidth parts across asymmetric dynamic spectrum sharing (DSS) networks, comprising:
  operating DSS in a mobile communications network that includes a first wireless standard technology and a second wireless standard technology;
  operating a radio network node that monitors traffic usage in a first RAT and a second RAT, wherein the first RAT operates in the first wireless standard technology and the second RAT operates in the second wireless standard technology;
  establishing a bandwidth for a particular band;
  identifying a DSS bandwidth within the particular band, wherein the DSS bandwidth is shared between first RAT users and second RAT users;
  identifying one or more non-shared bandwidths within the particular band, wherein the one or more non-shared bandwidths are for first RAT users only;
  wherein a combination of the DSS bandwidth and the one or more non-shared bandwidths equals the bandwidth of the particular band;
  monitoring traffic usage in each of the DSS bandwidth and the one or more non-shared bandwidths; and
  when a second RAT utilization is higher than a second operator-defined threshold in the DSS bandwidth,
  1) identifying one or more non-shared bandwidths that have traffic usage lower than their respective one or more first operator-defined thresholds;
  2) identifying a portion of the first RAT users to be moved from the DSS to the identified one or more non-shared bandwidth that have traffic usage lower than their respective one or more first operator-defined thresholds based on identifying the one or more non-shared bandwidths having traffic usage lower than their respective one or more first operator-defined thresholds; and 3) redirecting the identified portion of the first RAT users from the DSS bandwidth to the identified one or more non-shared bandwidths that have traffic usage lower than their respective one or more first operator-defined thresholds to accommodate the second RAT utilization in the DSS bandwidth, wherein the first operator-defined threshold and the second operator-defined threshold are definable by an operator based on traffic usage.

2. The method of claim 1, wherein the radio network node is selected from a group comprising eNodeB, gNB, and ng-eNB.

3. The method of claim 2, wherein the first wireless standard technology is 5G wireless technology and the second wireless standard technology is 4G wireless technology.

4. The method of claim 3, wherein the first RAT is New Radio (NR) and the second RAT is Long Term Evolution (LTE).

5. The method of claim 4, wherein each of the DSS bandwidth and the one or more non-shared bandwidths is known as a bandwidth part.

6. The method of claim 5, wherein the bandwidth part is a contiguous set of physical resource blocks.

7. A system for resource allocation using bandwidth parts across asymmetric dynamic spectrum sharing (DSS) networks, comprising:

a mobile communications network that is configured to operate dynamic spectrum sharing (DSS) that includes 5G wireless technology and 4G wireless technology;

a radio network node that is configured to monitor traffic usage in New Radio (NR) and Long Term Evolution (LTE), wherein NR operates in 5G wireless technology and LTE operates in 4G wireless technology;

the radio network node that is configured:

to establishing a bandwidth for a particular band;

to identify a DSS bandwidth within the particular band, wherein the DSS bandwidth is shared between NR users and LTE users;

to identify one or more non-shared bandwidths within the particular band, wherein the one or more non-shared bandwidths are for NR users only; and wherein a combination of the DSS bandwidth and the one or more non-shared bandwidths equals the bandwidth of the particular band;

to monitor traffic usage in each of the DSS bandwidth and the one or more non-shared bandwidths;

when a LTE utilization is higher than a LTE operator-defined threshold in the DSS bandwidth, the radio network node is configured:

to identify one or more non-shared bandwidths that have traffic usage lower than their respective one or more NR operator-defined thresholds;

identifying a portion of the NR users to be moved from the DSS to the identified one or more non-shared bandwidth that have traffic usage lower than their respective one or more NR operator-defined thresholds based on identifying the one or more non-shared bandwidths having traffic usage lower than their respective one or more NR operator-defined thresholds; and to redirect the portion of NR users from the DSS bandwidth to the identified one or more non-shared bandwidths that have traffic usage lower than their respective one or more NR operator-defined thresholds to accommodate LTE utilization in the DSS bandwidth, wherein the NR operator-defined threshold and the LTE operator-defined threshold are definable by an operator based on traffic usage.

8. The system of claim 7, wherein the radio network node is selected from a group comprising eNodeB, gNB, and ng-eNB.

9. The system of claim 8, wherein each of the DSS bandwidth and the one or more non-shared bandwidths is known as a bandwidth part.

10. The system of claim 9, wherein the bandwidth part is a contiguous set of physical resource blocks.

* * * * *